United States Patent [19]

Nakamaru et al.

[11] Patent Number: 5,256,377

[45] Date of Patent: Oct. 26, 1993

[54] OZONE DECOMPOSING MATERIAL AND OZONE DECOMPOSING APPARATUS USING THE OZONE DECOMPOSING MATERIAL

[75] Inventors: Susumu Nakamaru, Nagareyama; Ichiro Shibanai; Yuji Noritake, both of Tokyo; Sakae Shimizu, Chigasaki, all of Japan

[73] Assignees: Ricoh Company, Ltd.; Japan Liquid Crystal Co., Ltd., both of Tokyo, Japan

[21] Appl. No.: 927,724

[22] Filed: Aug. 11, 1992

Related U.S. Application Data

[60] Division of Ser. No. 613,928, Nov. 14, 1990, abandoned, which is a continuation of Ser. No. 347,024, May 4, 1989, abandoned, which is a division of Ser. No. 187,726, Apr. 29, 1988, abandoned.

[30] Foreign Application Priority Data

Apr. 29, 1987 [JP] Japan .................. 62-105606
Aug. 28, 1987 [JP] Japan .................. 62-214519

[51] Int. Cl.⁵ ............................................. A62B 11/00
[52] U.S. Cl. .................................... 422/122; 422/30; 96/131; 96/133; 96/153
[58] Field of Search ............ 422/30, 122; 55/387; 423/219, 581

[56] References Cited

U.S. PATENT DOCUMENTS

| | | | |
|---|---|---|---|
| 3,261,147 | 7/1966 | Allander | 55/387 |
| 3,747,308 | 7/1973 | Versluis et al. | 55/387 |
| 3,806,323 | 4/1974 | Thomspson | 422/122 |
| 4,101,296 | 7/1978 | Lowther | 55/33 |
| 4,370,301 | 1/1983 | Doi et al. | 422/122 |
| 4,421,533 | 12/1983 | Nishino et al. | 55/68 |
| 4,680,040 | 7/1987 | Gooray et al. | 423/581 X |
| 4,808,396 | 2/1989 | Shibanai et al. | 252/188.1 X |
| 4,853,735 | 8/1989 | Kodama et al. | 220/359 |

FOREIGN PATENT DOCUMENTS

| | | |
|---|---|---|
| 0038224 | 10/1981 | European Pat. Off. . |
| 1769673 | 12/1970 | Fed. Rep. of Germany . |
| 2736109 | 2/1979 | Fed. Rep. of Germany . |
| 71038958A | 11/1971 | Japan . |
| 0064675 | 6/1978 | Japan ........................... 422/122 |
| 0121330 | 9/1980 | Japan ........................... 55/387 |
| 0129132 | 10/1980 | Japan ........................... 55/387 |
| 61-64315 | 4/1986 | Japan . |
| 1064315 | 4/1986 | Japan ................. 252/188.28 X |
| 1161121 | 7/1986 | Japan ........................... 422/122 |
| 249464 | 8/1925 | United Kingdom ........... 55/387 |
| 1585574 | 3/1981 | United Kingdom . |
| 2056424 | 3/1981 | United Kingdom . |
| 2089671 | 6/1982 | United Kingdom . |
| 2142324 | 1/1985 | United Kingdom . |

OTHER PUBLICATIONS

Chem. Abstracts, vol. 105, 1986, No. 26525m.

Primary Examiner—Robert J. Warden
Assistant Examiner—Laura E. Collins
Attorney, Agent, or Firm—Oblon, Spivak, McClelland, Maier & Neustadt

[57] ABSTRACT

An ozone decomposing material comprises an ozone decomposing agent and a support material for supporting thereon the ozone decomposing agent by adsorption, and an ozone decomposing apparatus comprises the above ozone decomposing material and an ozone decomposing agent supply means for supplying the ozone decomposing agent to the support material, by which the ozone decomposing agent is adsorbed.

7 Claims, 5 Drawing Sheets

OZONE DECOMPOSING MATERIAL AND OZONE DECOMPOSING APPARATUS USING THE OZONE DECOMPOSING MATERIAL

This application is a division of application Ser. No. 07/613,928 filed on Nov. 14, 1990, now abandoned, which is a continuation of application Ser. No. 07/347,024 filed on May 4, 1989, now abandoned, which is a division of application Ser. No. 07/187,726 filed on Apr. 29, 1988, also abandoned.

BACKGROUND OF THE INVENTION

The present invention relates to an ozone decomposing material for decomposing ozone and an ozone decomposing apparatus using the ozone decomposing material, which can be employed, for instance, not only in electrostatic coping machines provided with a corona charger and laser printers, but also in waterworks and sewerage systems, and an apparatus for activating the surface of synthetic resin films for improving the ink receptivity and adhesiveness thereof.

Ozone is generated, for instance, in the above-mentioned apparatus and is toxic to humans when breathing air containing more than 0.1 ppm of ozone for a long period of time. According to the safety standards for ozone to humans proposed by Japanese Association of Industrial Health, ACGIH (American Conference of Governmental Industrial and Hygienists), and OSHA (Occupational Safety and Health Administration), the permissible maximum average concentration of ozone in the air is 0.1 ppm when breathing the air for 8 hours. Many apparatus for industrial use are produced by observing these standards. Ozone has a characteristic pungent odor, and the odor is noticeable even at concentrations as low as 0.01 to 0.02 ppm. Some operators of an industrial apparatus which generates ozone at such concentrations may complain about the odor. When the concentration amounts to about 0.05 ppm, it has an unpleasant odor, and when the concentration exceeds 0.1 ppm, it is irritating to mucus membranes of the eyes and respiratory organs.

Further, ozone is a powerful oxidizing agent which oxidizes and deteriorates organic materials. Therefore, it is desirable that the concentration of ozone be as low as possible, not only to humans, but also to industrial apparatus and devices.

Conventionally, various ozone decomposing materials and ozone decomposing apparatus have been invented. However, when preparing an ozone decomposing apparatus is made, the ozone decomposing performance, the pressure loss and the flow rate of the air from which ozone is eliminated, the humidity conditions, and the deterioration of the ozone decomposing material with time, have to take into consideration. However it is extremely difficult to make an ozone decomposing apparatus and an ozone decomposing material which satisfy the above-mentioned conditions as a whole.

Electrophotographic copying machines including a corona charger and air cleaners generate ozone at low concentrations. Most of them are provided with an ozone decomposing apparatus in the shape of a filter, in which an ozone decomposing member made of, for instance, an activated carbon filter, is employed.

However, the concentration of the ozone generated in the currently employed PPC is about 1 ppm or less and a honeycomb-like activated carbon filter for decomposing the ozone at such low concentrations deteriorate with time to a not negligible extent and lasts only for several months.

Further a large size corona charger for activating the surface of a resin film, and sterilization apparatus using an ultra-violet light source and decolorization apparatus generate ozone at high concentrations. For decomposing ozone at a high concentration, a large amount of granular active carbon, metal catalysts, organic compounds such as manganese dioxide, and mixtures thereof are employed. However, the ozone decomposing performance of these agents is not yet satisfactory.

Furthermore, when a variety of filters such as activated carbon filter and Hopcalite filter are employed, the air containing ozone has to be passed through such a filter. When the density of the filter is increased, the ozone absorption and decomposition performance is also increased. However, the air cannot be passed through the filter smoothly, since the pressure loss is increased as well. As a result, the problem is caused that the problem is caused that the temperature within the apparatus including the ozone decomposing filter is disadvantageously elevated. The elevation of the temperature within the apparatus will eventually shorten the life of the apparatus.

On the contrary, when the density of the filter is decreased, the ozone adsorption and decomposing performance is also decreased.

In any event, it is necessary to provide a powerful suction apparatus or blower in order to cause the ozone-containing air to pass through the filler. However, such suction apparatus or blower causes noise. Furthermore, in order to minimize the elevation of the temperature within the ozone generating apparatus, a cooling apparatus is also necessary, so that apparatus including the conventional ozone decomposing apparatus is costly as a whole. Further there is a demand for a small size, powerful ozone decomposing apparatus for use in the activation of the surface of resin films and sterization apparatus. However, such a demand is not yet met.

SUMMARY OF THE INVENTION

It is therefore a first object of the present invention to provide an improved ozone decomposing material, the ozone decomposing performance of which lasts for an extended period of time, which ozone decomposing material comprises, preferably, any of the terpenoid ozone decomposing agents (as disclosed in Japanese Laid-Open Patent Application 61-64315 and Japanese Laid-Open Patent Application 61-202268) and a support material by which the ozone decomposing agent is adsorbed.

A second object of the present invention is to provide an ozone decomposing apparatus in which the above ozone decomposing material is employed, for which the ozone decomposing performance is maximized and the pressure loss of the air to be passed through the ozone decomposing apparatus is minimized.

The first object of the present invention is attained by an ozone decomposing material comprising any of the above-mentioned terpenoid ozone decomposing agents and a support material for the ozone decomposing agent, which may be in a granular, honeycomb-like or fibrous form, or in any other structure, and which may be made of any materials, preferably a material having ozone decomposing performance itself, such as activated carbon, metal catalysts and inorganic materials, which absorb the ozone decomposing agent at the surface thereof or in the porous portions thereof.

The second object of the present invention is attained by an ozone decomposing apparatus which comprises a first container containing therein a terpenoid ozone decomposing agent, and a second container containing therein a support material for the ozone decomposing agent, which first and second containers are connected to each other through an air flow path by which the vapor of the terpenoid ozone decomposing agent is transported onto the support material so as to be adsorbed thereon. The ozone decomposing apparatus is constructed in such a fashion that the ozone decomposing agent is caused to be dispersed in the form of vapor throughout the air to be subjected to ozone decomposing treatment by utilizing the energy of the air which is moved onto the ozone decomposing material, and the ozone decomposing agent is constantly adsorbed by the support material, whereby the ozone decomposing performance is caused to last for an extended period of time.

DETAILED DESCRIPTION OF THE PREFERRED EMBODIMENTS

Figure 1:
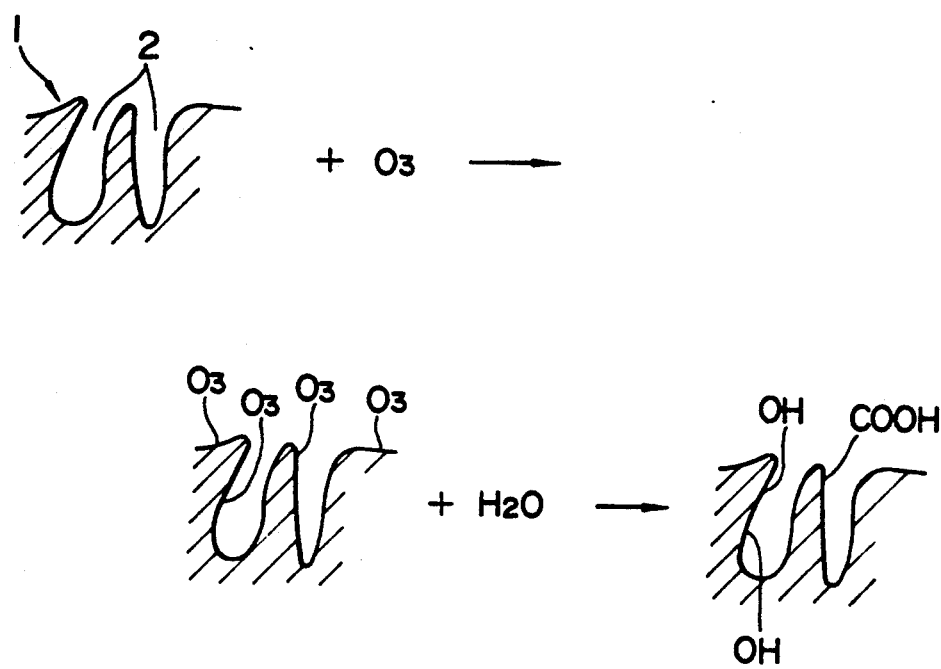
FIG. 1 is an illustrative diagram in explanation of the steps through which the ozone decomposing performance of activated carbon is decreased while in use.

The terpenoid compounds employed as ozone decomposing agent in the present invention are such terpenoids having a general formula of $C_mH_{2n+14}$ (m=9~15, n=0~4, p=0~2), which are readily oxidized by ozone. It is considered that a representative example of terpenoid compounds, d-limonene, reacts with ozone as follows:

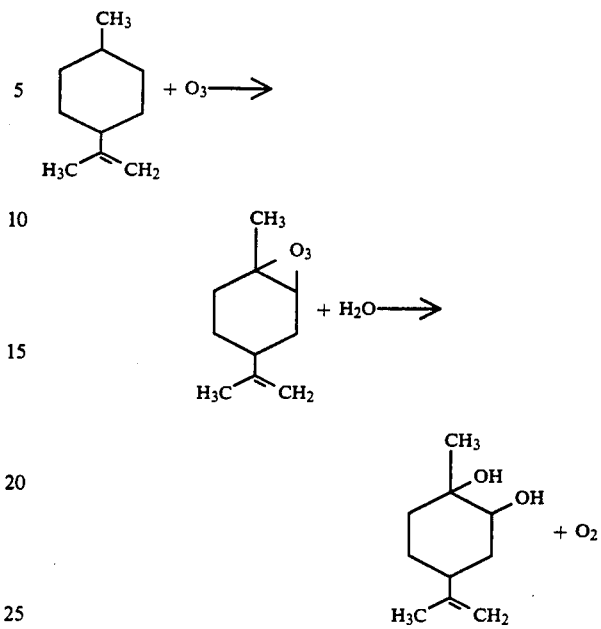

In the present invention, when as a support material for the ozone decomposing agent, a support material having an ozone decomposing performance, such as activated carbon, is used in combination with any of the abvove terpenoid compounds, the deterioration of the ozone decomposing material can be minimized.

Specific examples of the terpenoid compounds represented by the above general formula are as follows:

$C_9H_{14}$: santene;
$C_9H_{14}O$: cryptone;
$C_9H_{16}$: cyclogeraniolene;
$C_{10}H_{14}O$: safranal, perillaldehyde, carvone, piperitenone, myrtenal, umbellulone, verbenone and pinocarvone;
$C_{10}H_{16}$: B-myrcene, ocimene, limonene, dipentene, isolimonene, terpinene, phellandrene, 2,8,(9)-p-menthadiene, sylvestrene, carene pinene, camphenene, bornylene, fenchene and orthodene;
$C_{10}H_{16}O$: citral, tegetone, artemisiaketone, isoartemisiaketone, cyclocitral, perillyl alcohol, carveol, phellandral, piperitone, pulegone, isopulegone, carvenone, dihydrocarvone, carvotanacetone, pinol, sabinol, pinocarveol, myrtenol, vervenol and cis-3-hexenol;
$C_{10}H_{16}O_2$: diosphenol and ascaridole;
$C_{10}H_{18}O$: Linalool, geraniol, cyclogeraniol, nerol, lavandulol, citronellal, 2,6-dimethyl-7-octene-4-one-dyhydrocarveol, pulegol, isopulegol, piperitol, terpineol and terpinenol;
$C_{10}H_{18}$: menthene;
$C_{10}H_{20}O$: citronellol;
$C_{11}H_{18}O$: nopol;
$C_{13}H_{20}O$: ionone and parmone;
$C_{14}H_{22}O$: irone;
$C_{15}H_{24}$: bisabolene, zingiberene, curcumene, cadinene, isocadinene, sesquibenihene, selinene, caryophyllene, metrosiderene, aromadedrene, cedreen, copaene, longifolene and santalene;
$C_{15}H_{24}O$: lanceol, sesquibenihiol, partheniol and santalol;
$C_{15}H_{26}O$: farnesol, nerolidol, elemol, cadinol, eudesmol, quaiol, carotol and cedrol;

$C_{15}H_{22}O$: atlantone, turmerone, cyperone, eremophilone and vetivone.

In the above terpenoid compounds represented by the general formula $C_mH_{2n+14}$ (m=9~15, n=0~4, p=0~2), since the terpenoid compounds having 8 or less carbon atoms are in the form of vapor at room temperature, it is extremly difficult to maintain such terpenoid compounds at a low concentration, so that there is the risk that the concentration is easily increased. Further such terpenoid compounds are not only liable to catch fire, but also have an extremely unpleasant odor. On the other hand, the terpenoid compounds having 16 or more carbon atoms are not easily evaporated, therefore the ozone decomposing performance is hardly obtained.

In the above listed terpenoid compounds, limonene is particularly preferable for use in the present invention since it has the most significant ozone decomposing performance. As a commercial product of limonene, "Odo-Raser Compound" (Trademark) made by Vaportek Inc. in the State of Wisconsin in the United States, is preferable for use, which is a mixture of a variety of terpineol type vegetable extracts.

Each of the above terpenoid compounds can be used as is by placing the compound in a container for an ozone decomposing agent. It is preferable that the terpenoid compound be employed by containing it in an alcoholic gel or a water-soluble gel so as to control the evaporation rate of the terpernoide compound.

When the terpenoid compound is contained in the above-mentioned alcohol gel, it is preferable that the terpenoid compound be in the range of 1 to 80 parts by weight, more preferably in the range of 20 to 50 parts by weight; an alcohol in the range of 10 to 97 parts by weight, more preferably in the range of 40 to 60 parts by weight; and a saturated solution (about 25%) of dibenzylidene sorbitol or a phosphoric acid bis(4-t-butyl-phenyl) sodium in N-methyl-2-pyrrolidone in the range of 1 to 10 parts by weight, to 100 parts by weight of the ozone decomposing agent.

Further, as an auxiliary gelation agent, it is preferable to add to the above ozone decomposing agent a 2 to 3%-benzyl alcohol solution of a cellulose derivative or a 2 to 5%-benzyl alcohol of polyvinyl pyrrolidone. Furthermore, glycols and glycerin may be added to the above for controlling the gelation rate.

As a water-soluble gelation agent, sodium polyacrylate, sodium alginate, gelatin, agar, gelan gum, and succinoglucan may be employed. As an auxiliary gelation agent for such water-soluble gelation agents, cellulose derivatives can be employed. In this case, it is preferable that the amount of the terpenoid compound be in the range of about 20 to 50 wt. %.

As the support material for the ozone decomposing agent for use in the present invention, any materials can be employed so long as they allow the air to pass therethrough and are capable of holding or adsorbing an ozone decomposing agent such as terpenoid compounds at the surface thereof. Examples of such materials are honeycomb-like ceramics and honeycomb-like ceramics fibers (made of cordierite) (Trademark "Honeycle" made by Nichiasu Corporation), and activated carbon.

Of the above materials, activated carbon is one of the most preferable materials since it not only traps or adsorbs the terpenoid compounds at the surface thereof, but also has the function of decomposing ozone to some extent. In other words, activated carbon has adsorptivity not only for the terpenoid ozone decomposing agent, but also for ozone. In particular, honeycomb-like paper in which honeycomb-like activated carbon is contained during the manufacturing of the paper is preferable for use in the prsent invention. When the terpenoid compound is adsorbed in the activated carbon, the ozone decomposing performance is enhanced by the synergism of the two when ozone comes into contact with the terpenoid compound which is adsorbed by activated carbon.

Activated carbon, which is considered to be one of the best support materials for the terpenoid compounds, has numerous fine holes having a radius of about 100 Å, which is considered to adsorb ozone and decompose the same. However, ozone is so extremely strong an oxidizing agent that the surface of activated carbon or the surface of the fine holes thereof is oxidized in the course of the adsorption of ozone, following the steps as illustrated in FIG. 1. Eventually, the oxidizing performance of the activated carbon is significantly decreased.

Tests for investigating the synergism of activated carbon and terpenoid for decomposition of ozone will now be explained.

[Test 1]

An activated carbon filter which had been used for about 25 hours in an electrophotographic copying machine, corresponding to the time required for making about 10,000 copies in the copying machine, was adsorbed with about 6 wt. % of terpenoid (d-limonene) and subjected to an ozone decomposing test in which the filter was incorporated in an experimental copy making machine and copies were made continuously. The amount of the ozone discharged from the copying machine per hour during the copy making process was 0.7 ml/hr.

[Test 2]

Test 1 was repeated except that the activated carbon filter employed in Test 1 was replaced by an activated carbon filter which had been used for 25 hours, without absorption of the terpenoid employed in Test 1. The amount of the ozone discharged from the copying machine per hour during the copy making process was 4.0 ml/hr.

[Test 3]

Test 1 was repeated except that the activated carbon filter employed in Test 1 was removed. The amount of the ozone discharged from the copying machine per hour during the copy making process was 13.4 ml/hr.

The above data indicate that the ozone decomposing performance of the used activated carbon can be significantly recovered by the adsorption of terpenoid.

It is considered from the above data that when activated carbon is employed in the present invention, terpenoid is adsorbed by the surface of the fine pores of the activated carbon, and when ozone comes into contact with the activated carbon, the ozone is decomposed before the activated carbon is oxidized. Therefore, if termpenoide is constantly supplied onto the activated carbon, the decomposition rate of ozone is improved and the deterioration of the activated carbon can be prevented.

Figure 2:
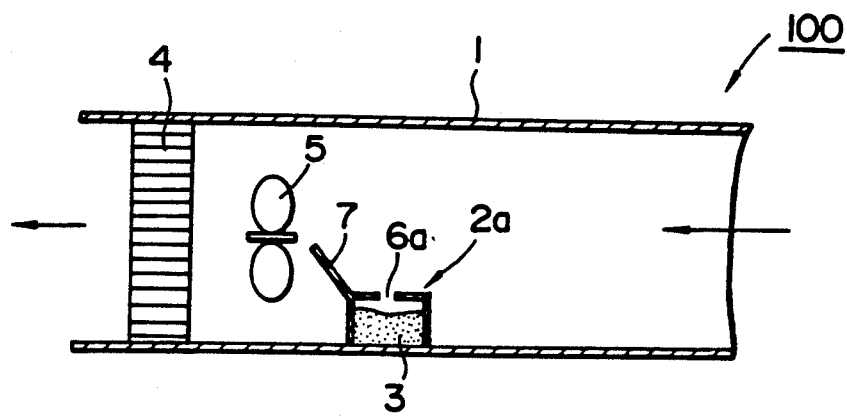
FIG. 2 is a schematic diagram of an ozone decomposing apparatus 100 according to the present invention

FIG. 2 illustrates an example of an ozone decomposing apparatus 100 according to the present invention, in which an ozone decomposing material according to the present invention is employed. In the figure, reference numeral 1 indicates an air duct in which the air from which ozone is to be eliminated flows in the direction of the arrow. In the air duct 1, a container 2a containing therein a terpenoid ozone decomposing agent 3 is disposed upstream of the air flow. Reference numeral 6a indicates a hole made in the container 2, from which the vapor of the terpenoid ozone decomposing agent 3 comes out. A honeycomb-like activated carbon filter 4, which serves not only as a support material for the ozone decomposing agent, but also as an ozone decomposing element, is disposed downstream of the air flow. Between the container 2a and the activated carbon filter 4, a fan 5 is disposed. By the ventilating force of the fan 5, the vapor of the terpenoid ozone decomposing agent 3 is dispersed from the container 2a and caused to be adsorbed throughout the activated carbon filter 4.

Figure 3:
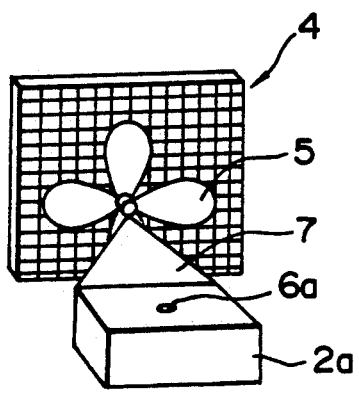
FIG. 3 is a schematic perspective view of the main portion of the ozone decomposing apparatus as shown in FIG. 2.
Figure 4:
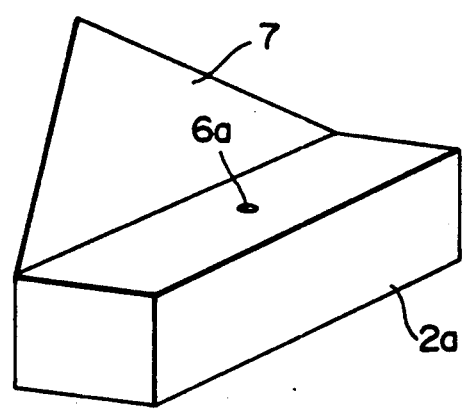
FIG. 4 is a schematic perspective view of a container for an ozone decomposing agent in the ozone decomposing apparatus as shown in FIG. 2.

FIG. 3 is a perspective view of the main portion of the ozone decomposing apparatus as shown in FIG. 2. FIG. 4 is an enlarged perspective view of the container 2. In these figures, reference numeral 7 indicates a guide plate for dispersing the vapor of the terpenoid ozone decomposing agent 3 uniformly.

Figure 5:
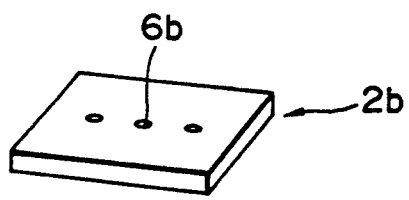
FIG. 5 is a schematic perspective view of another container for an ozone decomposing agent for use in the ozone decomposing apparatus as shown in FIG. 2.

FIG. 5 shows another example of the container for the terpenoid ozone decomposing agent 3, a container 2b, in which a plurality of holes 6b are made.

Figure 6:
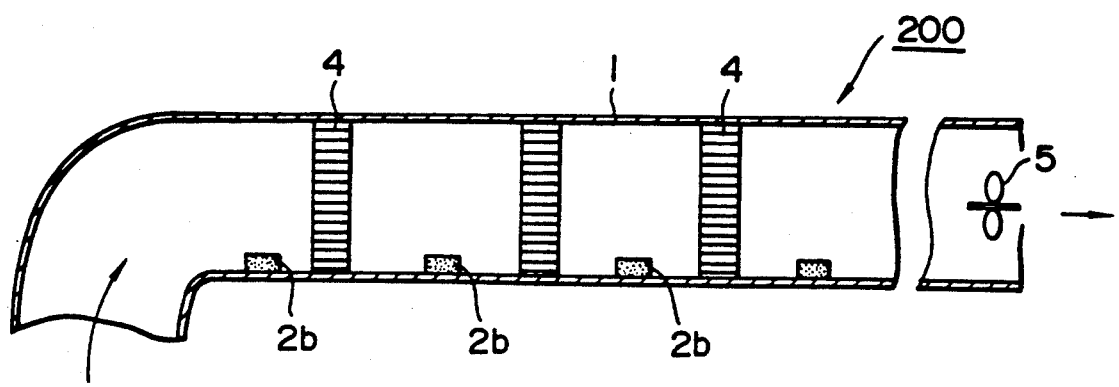
FIG. 6 is a schematic diagram of an ozone decomposing apparatus 200 according to the present invention.

When the concentration of ozone is high, for instance, 100 ppm or more, as in an apparatus for activating the surface of resin films and a sterilization apparatus for waterworks and sewage-treatment systems, it is preferable to place the ozone decomposing filter 4 (comprising any of granular activated carbon, honeycomb-like activated carbon, and fibrous activated carbon) and the container 2a or 2b for the terpenoid ozone decomposing agent 3 alternatively in the air duct 1, thereby constructing an ozone decomposing apparatus 200, as illustrated in FIG. 6. This ozone decomposing apparatus works better than the conventional ozone decomposing apparatus. Further, this apparatus is not only less expensive, but also smaller in size than the conventional ozone decomposing apparatus.

In particular, when the concentration of ozone is, for instance, as high as 500 ppm or more, since the ozone cannot be decomposed to 0.1 ppm by a single step, the ozone decomposing apparatus as illustrated in FIG. 6 is effective in which ozone is decomposed step by step by use of a plurality of combinations of the ozone decomposing agent 3 contained in the container 2a or 2b and the ozone decomposing filter 4. The number of the containers 2a or 2b and the ozone decomposing filters 4, the length of the air duct 1, the power of the fan 5, and the number of the holes made in each container 2b are determined in accordance with the desired ozone decomposition rate.

As in an electrophotographic copying machine, when the ozone decomposing filter 4, the fan 5 and the terpenoid container 20 are closely disposed, it is preferable to use the guide plate 7 for guiding the vapor of the terpenoid ozone decomposing agent 3 onto the entire surface of the ozone decomposing filter 4.

Example 1-1

A honeycomb-like activated carbon filter (made by Toyobo Co.,Ltd.), which was used in an electrophotographic copying machine for a period of time corresponding to the time required for making about 15,000 copies in the copying machine, was placed together with d-limonene in a desiccator for 2 days, so that d-limonene was adsorbed by the used activated carbon filter. The weight ratio of the absorbed amount of d-limonene to the weight of the activated carbon was 1 to 17, that is, 1 g of d-limenene was adsorbed by 17 g of activated carbon.

[Measurement 1]

Air containing ozone was caused to flow, without incorporating the above activated carbon therein, through an air duct at a flow rate of 1 m/sec and the amount of ozone which was accumulated for 1 hour at the outlet thereof was measured by an ozone analyzer (Trademark "Monitor Labs Ozone Analyzer 4810E). The result was 14.0 ml/hr.

[Measurement 2]

Measurement 1 was repeated except that the above-mentioned used activated carbon filter, without d-limonene being absorbed therein, was incorporated in the air duct, so that the amount of ozone at the outlet was measured by the same ozone analyzer. The result was 5.0 ml/hr.

[Measurement 3]

Measurement 1 was repeated except that the above-mentioned d-limonene absorbed, activated carbon filter was incorporated in the air duct, so that the amount of ozone at the outlet was measured by the same ozone analyzer. The result was 1.0 ml/hr.

Example 1-2

Hydroxy propylcelluose was added at a concentration of 3% to purified benzyl alcohol and the mixture was subjected to high speed stirring, so that hydroxy propylcellulose was dissolved in benzyl alcohol.

40 parts by weight of the above solution, 40 parts by weight of d-limonene, and 15 parts by wiehgt of propylene glycol were mixed and the mixture was stirred slowly.

5 parts by weight of a saturated solution of dibenzylidenesorbitol in N-methyl-2-pyrrolidone were dropwise added to the above mixture and stirred for 10 minites to prepare a viscous liquid. This vicous liquid was allowed to stand at room temperature for 1 hour, whereby a jelly-like gelled terpenoid ozone decomposing agent was obtained.

In the air duct as illustrated in FIG. 2, the same activated carbon filter as that employed in Example 1-1, the fan 5, and the container 2a containing therein the above prepared terpenoid ozone decomposing agent 3, having an opening 6 with a diameter of 2 mm, were placed. Air containing ozone was then caused to flow through the air duct at a flow rate of 1 m/sec.

By use of the same ozone analyzer as that employed in Example 1-1, the concentration of ozone at the outlet was measured. Initially the concentration of ozone was 0.02 ppm. This concentration was maintained for 5 hours.

The above indicates that the deterioration of the activated carbon filter was prevented by the supply of d-limonene from the container 2a.

The evaporation amount of the terpenoid per hour at 20° C. at the above flow rate of the air was 0.1 g and the amount of the terpneoide contained in the container was 100 g.

Therefore, if it is incorporated in an electro-photographic photoconductor which is operated for 5 hours a day, the ozone decomposing agent will last for about 200 days.

The pressure loss through the activated carbon filter in the air duct was 2 mm/H$_2$O. This pressure loss was not changed at all.

Example 1-3

A gas discharge outlet of an apparatus for activating the surface of a resin film (for example, polyester film and polethylene film) was connected to the air duct of the ozone decomposing apparatus as illustrated in FIG. 6.

The concentration of ozone discharged from the gas discharge outlet of the apparatus was 500 ppm. The diameter of the air duct was 100 mm and the length of the duct was 3 m. In this air duct, 10 activated carbon filters (Trademark "TAK Filter 800 Cell" made by Tokyo Roki Company, Ltd.) were placed and 10 containers (50×50×5 mm) made of a flexible thin aluminum plate, with 3 openings having a diameter of 2 mm, were fixed to the bottom of the air duct by use of a duplex adhesive tape as illustrated in FIG. 6.

The flow rate of the discharged air at the outlet of the duct was 0.5 m/sec. The pressure loss by each filter was 4 mm/H$_2$O.

Figure 7:
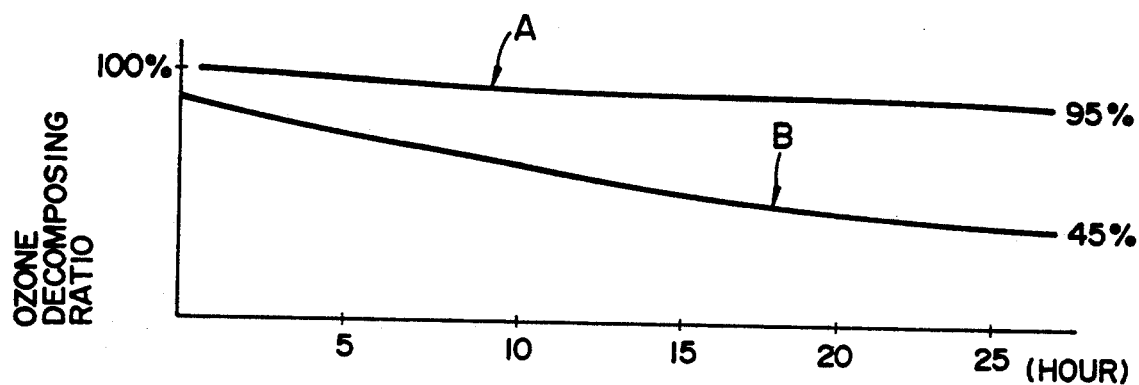
FIG. 7 is a graph showing the ozone decomposing performance obtained by the present invention and that obtained by the conventional ozone decomposing apparatus.

When only the activated carbon filters were incorporated, the ozone decomposing ratio was decreased to 45% in 25 hours as shown by curve B in FIG. 7. In contrast to this, when the containers containing the terpenoid were placed in combination with the activated carbon filters, the ozone decomposing ratio was maintained at 95% as shown by curve A in FIG. 7. It is considered that such high ozone decomposing performance for an extended period of time was attained since the terpenoid (d-limonene) was evaporated from the openings of the 10 containers and the vapor was absorbed by the activated carbon, so that d-limonene was oxidized by ozone, thereby decomposing ozone, before the activated carbon was oxidized.

Figure 8:
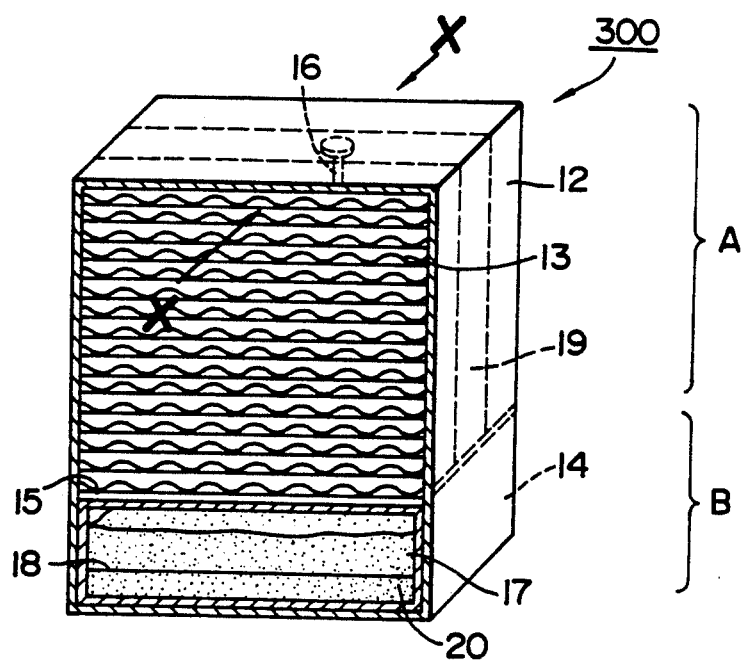
FIG. 8 is a schematic perspective view of an ozone decomposing apparatus 300 according to the present invention

FIG. 8 shows a further example of an ozone decomposing apparatus 300 according to the present invention.

The ozone decomposing apparatus 300 has an external wall 12 which encloses an upper ozone material decomposing portion A and a lower ozone decomposing agent holding portion B positioned directly below the upper portion A. The external wall 12 includes two sides, a top and a bottom, but has open sides so as to permit ozone bearing air to flow horizontally through the upper portion A in a direction generally corresponding to the arrows x.

An activated carbon filter 13 is positioned in the upper portion A. The filter 13 is composed of two parts which are spaced in the direction of flow of the ozone bearing air through the open sides of the external wall 12, so as to form a vacant portion 19 therebetween. The lower portion B supports a container 14 having an upper opening 11 and containing a volatile ozone decomposing agent 17, which may be a gelled terpenoid.

Figure 9:
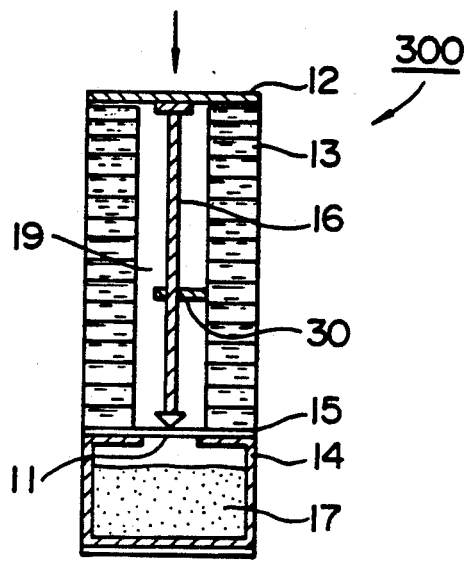
FIG. 9 is a section taken on line X—X of FIG. 8.

As seen in FIG. 9, the opening 11 is positioned at the bottom of the vacant portion 19, so that vapors of the ozone decomposing agent 17 can rise through the vacant portion to reach the activated carbon filter 13 and be absorbed thereon. The absorbed ozone decomposing agent is thus positioned for decomposing ozone in the air passing through the filter 13.

In this ozone decomposing apparatus, the size of the opening 11 of the container 14 and the shape of the vacant portion 19 are changed, depending, for instance, upon the volatility of the terpenoid and the degree of the gellation of the gelled terpenoid ozone decomposing agent in such a manner that the consumption of the terpenoid and the supply of the same are well balanced.

The container 14 includes a window 20 with a use limit line 18 thereon, through which the amount of the residual gelled terpenoid ozone decomposing agent 17 can be seen. When the amount of the gelled terpenoid 17 is decreased below the level indicated by the use limit line 18, the gelled terpenoid ozone decomposing agent 17 is discarded.

FIG. 9 is a section taken on line X—X in FIG. 8. As shown in this figure, an opening rod 16 is held by a rod support member 30 so as to be movable in the direction of the arrow. The opening 11 of the container 14 is closed with an aluminum sealing sheet 15. The outer wall 12 is made of, for instance, an elastic plastic film, metal foil or adhesive tape. When the outer wall 12 is depressed in the direction of the arrow so as to move down the opening rod 16, a hole is made in the aluminum sealing sheet 15, so that the closed opening 11 is opened. The result is that the vapor of the terpenoid component evaporated from the gelled terpenoid spreads throughout the activated carbon filter 13 through the vacant portion 19.

Figure 10:
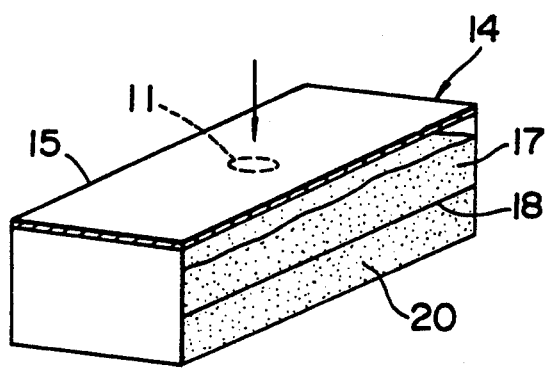
FIG. 10 is a schematic perspective view of a container for an ozone decomposing agent in the ozone decomposing apparatus 300 shown in FIG. 9.

FIG. 10 is a perspective view of the container 14 for the gelled terpenoid. As mentioned previously, the opening 11 in the upper surface of the container 14 is sealed by the aluminum sealing sheet 15, and when the opening rod 16 is pushed in the direction of the arrow, a hole is made in the aluminum sealing sheet 15 so that the covered opening 11 is opened. As a matter of course, a plurality of openings can be formed in the upper surface of the container 14 when necessary. In general, when the air does not flow above the opening 11, the dispersion rate of the vapor of the terpenoid component from the opening 11 depends upon the vapor pressure of the terpenoid component since the diameter of the opening 11 is as small as 1 to 3 mm. However, when the air flows above the opening 11, the dispersion rate of the vapor of the terpenoid component significantly increases depending upon the difference between the pressure within the container 14 and the pressure outside the container 14.

Figure 11:
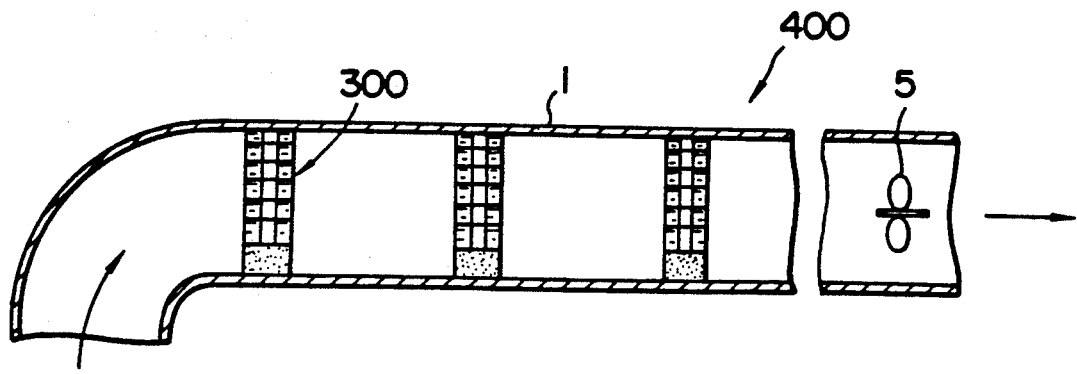
FIGS. 11 through 13 schematically show the application examples of the ozone decomposing apparatus 300 according to the present invention.

FIG. 11 is a schematic illustration of an ozone decomposing apparatus 400 according to the present invention, which is suitable for use with an apparatus for activating the surface of resin films for improvement of the ink receptivity and adhesiveness, and a sterilization apparatus for waterworks and sewage-treatment systems from which ozone is generated with a concentration of 500 ppm or more. In this ozone decomposing apparatus, a plurality of the ozone decomposing apparatus shown in FIG. 8 through FIG. 10 are incorporated in an air duct 1 as shown in FIG. 11. In this sense, this apparatus is much simpler in structure as compared with conventional ozone decomposing systems for use with the above-mentioned apparatus.

Figure 12:
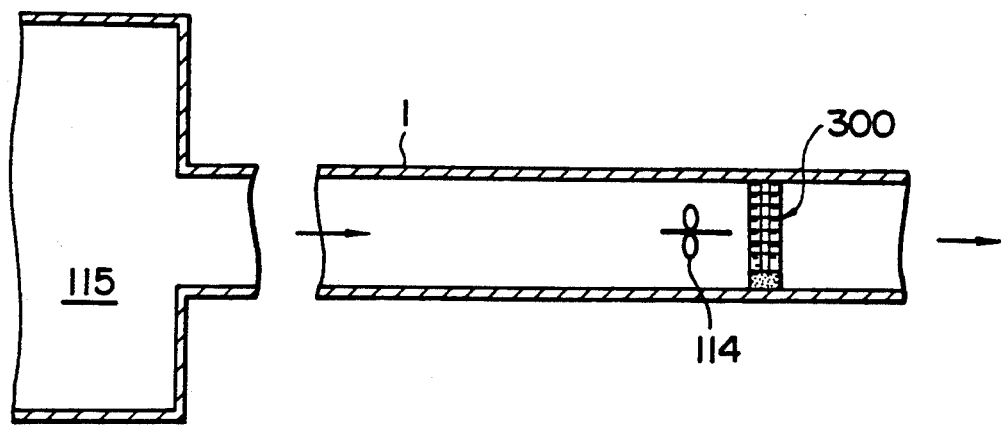

FIG. 12 is a diagram of a test apparatus for investigating the performance of the ozone decomposing apparatus 300 shown in FIG. 8 when it is used for a corona charging apparatus 115 of an electrophotographic copying machine, in which test apparatus a blower 114 is provided between the corona charging apparatus 115 and the ozone decomposing apparatus 300.

Figure 13:
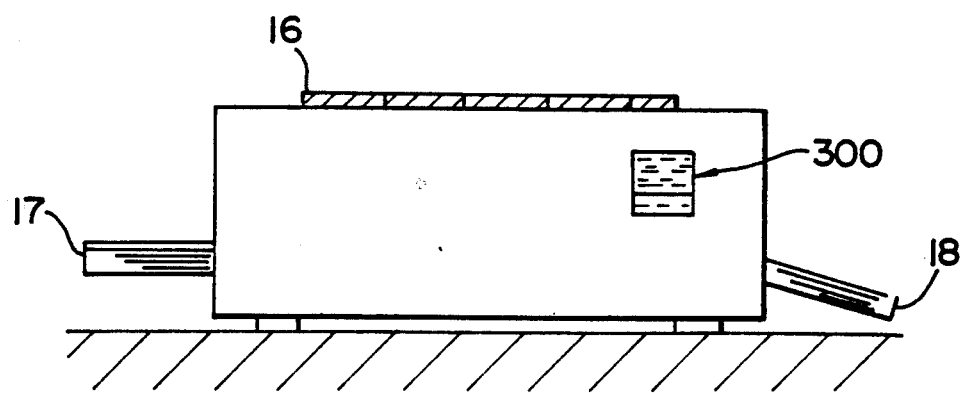

FIG. 13 schematically shows an electrophotographic copying machine in which the ozone decomposing apparatus shown in FIG. 8 is incorporated.

In both the ozone decomposing apparatus 400 as shown in FIG. 11 and the ozone decomposing apparatus incorporated in the electrophotographic copying apparatus 300 shown in FIG. 13, the timing for exchanging the used gelled terpenoid with a new gelled terpenoid can be checked from the previously mentioned use limit line 18 in the window 20.

Example 2-1

The ozone decomposing apparatus 300 as shown in FIG. 8 through FIG. 10 was constructed in the following manner:

A pair of honeycomb-like activated carbon filters (80 mm (H)×80 mm (W)×10 mm (P)) (made by Toyobo Co., Ltd.), with a gap of 10 mm therebetween, were fixed to a container (80×30×30 mm) containing 50 g of a gelled terpenoid by use of an adhesive tape. As the gelled terpenoid ozone decomposing agent, the same ozone decomposing agent as that prepared in Exmample 1-2 was employed.

The container was made of transparent polypropylene, with an opening having a diameter of 2 mm made in the upper side thereof. The opening was sealed by an aluminum foil. An opening rod, made of wood, having a length of 80 mm and a tip having a diameter of 1.8 mm, was supported by use of an adhesive tape and an opening rod support member in such a configuration as illustrated in FIG. 9.

Example 2-2

A honeycomb-like activated carbon filter (made by Toyobo Co., Ltd.) was used in a conventional electrophotographic copying machine, for a period of time corresponding to the time for making about 15,000 copies in the electrophotographic copying machine, whereby a first used honeycomb-like activated carbon filter was prepared.

In the same manner, a second used honeycomb-like activated carbon filter was prepared. The second used honeycomb-like activated carbon filter was placed together with the gelled terpenoid prepared in Example 1-2 in a desiccator for 1 day, so that the terpenoid was adsorbed by the second used honeycomb-like activated carbon filter.

The first activated carbon filter free from the terpenoid and the second activated carbon filter with the terpenoid absorbed therein were successively incorporated in an electrophotographic copying test machine as illustrated in FIG. 13.

The air flow rate at an air outlet of the test machine, at which any of the above activated carbon filters was incorporated, was 1 m/sec. The amount of the ozone discharged from the test copying machine was measured by Monitor Labs Ozone Analyzer 8410E.

[Test 4]

The test copying machine was run without incorporating any activated carbon filter.

[Test 5]

The test copying machine was run with the first activated carbon filter incorporated therein.

[Test 6]

The test copying machine was run with the second activated carbon filter incorporated therein.

The amounts of ozone discharged from the copying machine in the above tests were as follows:

|  | Test 4 (without Filter) | Test 5 (with First Filter) | Test 6 (with Second Filter) |
| --- | --- | --- | --- |
| 1st day | 14.0 ml/hr | 5.0 ml/hr | 1.0 ml/hr |
| 2nd day | 14.0 ml/hr | 5.1 ml/hr | 1.1 ml/hr |
| 3rd day | 14.0 ml/hr | 5.3 ml/hr | 0.9 ml/hr |
| 4th day | 14.0 ml/hr | 5.8 ml/hr | 0.8 ml/hr |

In the above tests, on the first day, the data were obtained one hour after the starting of the copying machine and thereafter the copying machine was run for 5 hours. On the second day, the third day and the fifth day, the data were obtained 10 minutes after the starting of the copying machine and thereafter the copying machine was run for 5 hours.

The first activated carbon filter free from the terpenoid had ozone decomposing performance to some extent. However, the ozone decomposing performance gradually decreased as can be seen from the above.

In contrast to this, the second activated carbon filter with the terpenoid adsorbed thereby maintained high ozone decomposing performance for an extended period of time, possibly because the terpenoid was continuously supplied to the activated carbon filter.

Example 2-3

The following two types of used activated carbon filters were prepared with the same shape and structure as in the used activated carbon filter employed in Example 2-1.

[Activated Carbon Filter A]

A honeycomb-like filter with activated carbon deposited on paper fibers.

[Activated Carbon Filter B]

A honeycomb-like filter with activated carbon contained in ceramics.

The above two types activated carbon filters A and B were employed individually and in combination with the same gelled terpenoid employed in Example 1-2, whereby the following four different ozone decomposing apparatuses were set up and incorporated in the test apparatus as shown in FIG. 12. They are Ozone Decomposing Apparatus A (Activated Carbon Filter A+Gelled Terpenoide), Ozone Decomposing Apparatus A' (Activated Carbon Filter A only), Ozone Decomposing Apparatus B (Activated Carbon Filter B+Gelled Terpenoide), and Ozone Decomposing Apparatus B' (Activated Carbon Filter B' only).

The ozone decomposing conditions were as follows:
Air flow rate at the outlet: 0.8 m/sec
Temperature and humidity: 20° to 25° C., 60 to 80%RH
Pressure loss: 2 mm/$H_2O$
Ozone detection apparatus: Ozone Analyzer 8410E
measurement position: within an area of 10 cm from the air outlet
Amount of ozone generated: 25 l/hr within an area of 10 cm from the air outlet without ozone decomprosing apparatus
Concentration of ozone generated: 1.0 to 1.2 ppm within an area of 10 cm from the air outlet without ozone decomposing apparatus
Method of measuring the concentration of ozone: Same as in Example 2—2
Evaporation rate of terpenoid: 0.1 g/hr at the above air flow rate from an opening having a diameter of 2 mm, and 0.01 g/hr from the opening when no air flows thereabove The results of the above measurement were as follows:

| Ozone Decomposing Apparatus | Concentration of Ozone (ppm) | | | |
| --- | --- | --- | --- | --- |
| | 1st Day | 2nd Day | 3rd Day | 5th Day |
| A | 0.10 | 0.10 | 0.08 | 0.07 |
| A' | 0.10 | 0.10 | 0.11 | 0.14 |
| B | 0.10 | 0.10 | 0.10 | 0.06 |
| B' | 0.10 | 0.10 | 0.12 | 0.13 |

The above results indicate that the terpenoid which evaporates from the opening of the container is adsorbed by any of the above activated carbon filters, regardless of the kind and shape thereof, so that the ozone decomposing performance of each of the activated carbon filters A and B is maintained.

What is claimed is:

1. An ozone decomposing apparatus, comprising:
   an external wall enclosing an upper ozone material decomposing portion and a lower ozone decomposing agent holding portion positioned directly below said upper portion, said external wall having open sides to permit ozone bearing air to flow horizontally through the upper portion;
   an activated carbon filter in said upper portion; and
   a volatile ozone decomposing agent in said lower portion, whereby vapors of the ozone decomposing agent rise and are absorbed by the activated carbon filter, and whereby ozone in ozone bearing air is decomposed by the ozone decomposing agent absorbed in the activated carbon filter.

2. The apparatus of claim 1 wherein said ozone decomposing agent comprises gelled terpenoid.

3. The apparatus of claim 1 including a container in said lower portion, the ozone decomposing agent being held in said container.

4. The apparatus of claim 3 wherein said activated carbon filter comprises two filter portions separated in a direction of flow of the ozone bearing air through said open sides so as to form a vacant portion therebetween, and wherein said container has an upper opening at a bottom of said vacant portion, whereby the vapors can reach said activated carbon filter via said vacant portion.

5. The apparatus of claim 4 including a sealing sheet covering said upper opening, and piercing means in said vacant portion for piercing said sealing sheet.

6. The apparatus of claim 5 wherein said piercing means comprise a vertically mounted rod having one end abutting said external wall and another end adjacent said sealing sheet, whereby said rod may be moved to pierce said sealing sheet by pressing said external wall.

7. The apparatus of claim 3 wherein said container includes a transparent window having a horizontal line to indicate a level of the ozone decomposing agent in said container.

* * * * *